United States Patent [19]

Patzchke

[11] 4,127,543
[45] Nov. 28, 1978

[54] AQUEOUS COATING COMPOSITION FREE FROM PHENOLIC RESIN

[75] Inventor: Hans-Peter Patzchke, Wuppertal, Fed. Rep. of Germany

[73] Assignee: Dr. Kurt Herberts & Co. Gesellschaft mit beschrankter Haftung Vorm. Otto Louis Herberts, Wuppertal, Fed. Rep. of Germany

[21] Appl. No.: 825,722

[22] Filed: Aug. 18, 1977

[30] Foreign Application Priority Data

Aug. 8, 1976 [AU] Australia .......................... 126224/76

[51] Int. Cl.² .......................... C09D 3/74; C09D 5/02; C09D 5/40
[52] U.S. Cl. .......................... 260/23 R; 260/23 AR; 260/23.7 A; 260/23.7 N; 260/29.6 RB; 260/29.6 RW; 260/29.6 WB; 260/32.6 R
[58] Field of Search .......... 260/23 R, 23 AR, 23.7 A, 260/23.7 N, 29.6 RB, 29.6 RW, 29.6 WB, 32.6 R; 204/181 R, 181 C

[56] References Cited

U.S. PATENT DOCUMENTS

| | | | |
|---|---|---|---|
| 3,546,184 | 12/1970 | Heidel et al. | 526/56 |
| 3,658,795 | 4/1972 | Daimer | 204/181 R |
| 3,766,215 | 10/1973 | Hesse et al. | 526/75 |
| 3,796,770 | 3/1974 | Daimer et al. | 204/181 R |
| 3,814,709 | 6/1974 | Meissner et al. | 204/181 R |
| 3,838,085 | 9/1974 | Myers et al. | 260/23 R |
| 3,853,801 | 12/1974 | Tominaga et al. | 204/181 R |
| 3,988,273 | 10/1976 | Tetsuo et al. | 260/23 AR |

FOREIGN PATENT DOCUMENTS 74-7,447  11/1974  South Africa.

*Primary Examiner*—Ronald W. Griffin
*Attorney, Agent, or Firm*—Donald D. Jeffery

[57] ABSTRACT

An aqueous coating composition free from phenolic resin containing a binder dilutable with water by neutralization with a base is disclosed. The coating composition is particularly useful for electro-dip-lacquering.

18 Claims, No Drawings

AQUEOUS COATING COMPOSITION FREE FROM PHENOLIC RESIN

BACKGROUND OF THE INVENTION

The production of coatings by the electrodeposition of film-forming materials on electrically conductive substrates under the influence of an applied voltage is known. This technique is being used to an increasing extent because it reduces pollution by saving solvents and, through automation, has a rationalizing effect. Known binders for this purpose are water-dilutable, carboxyl-group-containing olefin polymer oils obtained by reacting $\alpha,\beta$-unsaturated dicarboxylic acids or their anhydrides, particularly maleic acid anhydride, optionally in admixture with $\alpha,\beta$-unsaturated monocarboxylic acids, and/or semiesters and/or semiamides of these acids with olefin polymer oils substantially free from carboxyl groups etherified, heat-reactive condensation resins of formaldehyde with phenol carboxylic acids, optionally together with polyhydroxyl compounds containing at least two hydroxyl groups and having a molecular weight of from 50 to 3000, are used as combination resins in DT-AS No. 1,929,593 (U.S. Pat. No. 3,658,795) and DT-AS No. 2,120,962 (U.S. Pat. No. 3,796,770). Crosslinking with polyalcohols is generally recommended in DT-PS No. 1,219,684 (top of column 5) (U.S. Pat. No. 3,546,184) and DT-AS No. 2,013,096 (bottom of column 2) (U.S. Pat. No. 3,766,215), although the components to be used are not defined in any detail in regard to the service properties ultimately required.

For the practical application of a maleated butadiene oil, it is necessary to use modifying resins in addition to the carboxyl-group-containing olefin polymer oil because otherwise the coatings show an inadequate crosslinking density which is unfavourably reflected in their mechanical properties. Thus, according to DT-AS No. 1,929,593 and DT-AS No. 2,120,962. hardening is improved by using the known condensation products of formaldehyde with phenol derivatives. However, with increasing concentration of so-called foreign products such as these, protection against corrosion, as determined by the salt-spray test on unbonded steel plate, generally deteriorates. In addition to the atmospheric pollution involved both in the manufacture of phenolic resins and in the stoving of these films, the pronounced sensitivity to temperature is a troublesome factor, in other words disruptive electrical charges occur at elevated bath temperatures. In addition, pure olefin polymer oils show inadequate elasticity.

SUMMARY OF PRESENT INVENTION

The object of the present invention is to provide an aqueous coating composition free from phenolic resins which does not have any of the disadvantages referred to above and which gives high deposition voltages at elevated deposition temperatures, for example of the order of 30° C.

Accordingly, the present invention relates to an aqueous coating composition free from phenolic resins, more particularly for electro-dip-lacquering, containing a binder dilutable with water by neutralization with a base, characterised in that it contains in combination as binder component (A) 100 parts by weight of substantially anhydride-free reaction products containing carboxylic carboxyl groups and, in addition, ester and/or amide and/or imide groups and having a molecular weight of from 800 to 5000, preferably from 1000 to 5000, of
  a) substantially carboxyl-group-free olefin polymer oils and/or natural unsaturated oils, the latter or their mixtures with the substantially carboxyl-group-free olefin polymer oils having a hydrogenation iodine number of more than 150 and a content of saturated and/or mono-unsaturated fatty acids of less than 25% by weight, with
  (b) $\alpha,\beta$-unsaturated dicarboxylic acids or their anhydrides, particularly maleic acid anhydride, optionally in admixture with $\alpha,\beta$-unsaturated monocarboxylic acids, and/or esters and/or amides and/or imides of these acids, and/or by introducing ester, amide and/or imide groups into the reaction products,
the reaction products containing per gram of resin from 2.0 to 3.5 milliequivalents and more particularly from 2.4 to 3.0 milliequivalents of carboxyl groups and up to 2.4 milliequivalents, more especially up to 1.6 milliequivalents of ester, amide and/or imide groups, at least 50 milliequivalents and preferably at least 60 milliequivalents of 100 milliequivalents of the sum of milliequivalents of carboxyl groups, ester groups, amide groups and/or imide groups being carboxyl groups, and
(B) 5 to 80 parts by weight of substantially carboxyl-group-free, saturated long-chain polymers having a molecular weight of from 400 to 10,000 and containing from 1 to 12 milliequivalents of aliphatic alcohol groups,
the ratio of the carboxyl groups in the compounds of component (A) to the aliphatic alcohol groups in the compounds of component (B) amounting to between 0.9 and 15:1 and preferably to between 2 and 8:1.

In the context of the invention, 1 milliequivalent is the equivalent weight of the particular group in milligrams. Thus, the equivalent weight of the carboxyl group is approximately 45 g. If, therefore, 1 g of resin contains 45 mg of carboxyl groups, 1 g of resin contains 1 milliequivalent of carboxyl groups. In the context of the invention, the term "carboxyl groups" as used in the definition of the milliequivalents also includes acid anhydride groups, for example of maleic acid in the sense that 1 equivalent of anhydride group counts as two equivalents of carboxyl group.

The milliequivalents of carboxyl groups (hydroxyl groups) are calculated from the titrated acid number (hydroxyl number) divided by the molecular weight of KOH (56.1). The group

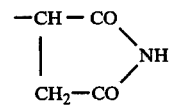

formed during the reaction and having an equivalent weight of 98 was counted as "imide" milliequivalent. The quantity of methanol used for the semi-esterification reaction is quoted for the "ester" milliequivalent.

DETAILED DESCRIPTION

The new coating composition according to the invention gives smooth films at bath temperatures of up to around 35° C. and, after stoving, a good hardness-to-elasticity ratio with effective protection against corrosion on bonded steel plate. In addition, the resins containing aliphatic alcohol groups present in the refill material improve the dispersion properties and reduce the solvent demand.

The production of reaction products containing carboxyl groups (component A) is carried out in known manner by reaction with natural oils or mixtures thereof with olefin polymer oils with $\alpha,\beta$-unsaturated acids or their anhydrides. In the context of the invention, olefin polymer oils are suitable polymers of 1,3-butadiene and/or 1,3-pentadiene and/or 2,3-dimethyl-1,3-butadiene and/or chloroprene, optionally with other copolymerizable monomers, such as styrene, $\alpha$-methyl styrene, vinyl toluene, (meth)acrylonitrile, (meth)acrylic acid esters, vinyl esters, vinyl ethers, vinyl ketones. The polymers predominantly contain isolated double bonds which may be partially hydrogenated. The configuration of the olefin polymer oils (1,4-cis, 1,4-trans, 1,2-vinyl) may differ according to the polymerization conditions used (temperature, catalyst, pressure). The choice of the diene polymer is normally dependent upon the required mechanical and electrical properties of the finished coating.

It is preferred to use polybutadiene oils containing at least 55% of the 1,4-configuration and having an average molecular weight (M$n$) of from 800 to 6000, preferably from 1000 to 3000, and a hydrogenation iodine number of at least 300 and preferably of at least 350. In the case of pure olefin oils, it is preferred to use the 1,4-cis-polybutadiene oil having an average molecular weight (M$n$) of from 800 to 3500 and preferably from 1000 to 2000.

The chain ends may contain carboxyl groups emanating from chain terminators. M$n$ represents the numerical average of the average molecular weight.

The unsaturated natural oils are obtained from vegetable and animal raw materials. Examples are glycerol esters of fatty acid mixtures containing large proportions of fatty acids with isolated or conjugated unsaturations, for example linseed oil, safflower oil, soya oil, wood oil, etc. However, it is also possible to produce corresponding esters of polyhydric alcohols, such as neopentyl glycol, glycerol, trimethylol propane, pentaerythritol with unsaturated fatty acids, such as linseed oil fatty acids, soya fatty acid, tall oil fatty acid, technical linoleic acid, catalytically isomerized linseed oil fatty acid or ricinene fatty acid. The molecular weights and viscosities of the starting oils may be adjusted to a more suitable level by boiling with stand oil at elevated temperatures.

In order to obtain suitable film hardnesses and elasticities during stoving, it is necessary to use mixtures of unsaturated oils which have a hydrogenation iodine number above 150, preferably above 200 and, with particular preference, above 250 and which contain less than 25% by weight, more especially less than 20% by weight, of saturated or mono-unsaturated fatty acids. The hydrogenation iodine number is the quantity of iodine in grams which is equivalent to that quantity of hydrogen which can be added with 100 g of the sample. This high content of double bonds creates additional crosslinking possibilities through the hydroperoxides which are formed during the anodic oxidation process. These conditions according to the invention are obtained by mixing natural oils having isolated unsaturations with natural oils and/or carboxyl-group-free olefin polymer oils having conjugated unsaturations. For mixtures with the above-mentioned natural oils, it is preferred to use synthetic olefin polymers containing from 10 to 40% by weight of the 1,4-cis, from 25 to 45% by weight of the 1,4-trans and from 20 to 45% by weight of the 1,2-vinyl configuration.

The mixture of natural oil and olefin polymer oil may be mixed with up to about 20% by weight of cyclopentadiene resin, coumarone-indene resin, degraded rubber or cyclo rubber before the maleation reaction.

The unsaturated dicarboxylic acid anhydrides used may be, for example, maleic acid anhydride, itaconic acid anhydride, citraconic acid anhydride, dimethyl maleic acid anhydride or $\alpha,\beta$-unsaturated dicarboxylic acids, such as fumaric acid, maleic acid or mesaconic acid, in which case water may be eliminated to close the ring during or after the addition reaction. It is preferred to use maleic acid anhydride in quantities of from 15 to 35% by weight, preferably in quantities of from 18 to 30% by weight and, with particular preference, in quantities of from 20 to 26% by weight, based on the resulting adduct of olefin polymer oil and/or natural unsaturated oil and acid anhydride. The reaction is best carried out in an inert gas atmosphere at 180° to 250° C. and preferably at 190° to 215° C. in the presence of solvents, such as technical xylene and/or radical inhibitors (sterically hindered phenols, secondary arylamines, p-phenylene diamine derivatives, phenothiazine). The solvent is best added in such a quantity that a resin solids content of from 85 to 97% by weight and preferably from 90 to 95% by weight is obtained. In order to compensate for any difference in reactivity between the natural and synthetic oils, it is possible to maleate the individual components which are then mixed for further processing. However, it is also possible to apply the onepot process by initially maleating one component and then adding the second component with more maleic acid anhydride, the particular concentration of anhydride being variable.

Preferred monoalcohols for the partial semiesterification of the maleated mixture of natural unsaturated and/or carboxyl-group-free olefin polymer oil are aliphatic alcohols containing from 1 to 6 carbon atoms, preferably from 1 to 4 carbon atoms, or cycloaliphatic alcohols containing 6 carbon atoms. To produce semiamides, the maleated butadiene oils are reacted with secondary amines. In this case, it is preferred to use aliphatic amines containing aliphatic groups of the type defined in reference to the alcohols. To produce compounds containing imide groups, the maleated butadiene oils are reacted with primary monoamines, ammonia-yielding compounds, such as ammonium carbonate, ammonium or urea.

Compounds of component (A) with advantageous properties are, for example, semiesters having an acid number of about 100 to 250, more especially from about 120 to 200, and a viscosity of from 400 to 2500 $mPa$ S (60:40 in butyl glycol), and imides having an acid number of from about 100 to 220, preferably from about 120 to 190, and a viscosity of from about 300 to 1800 $mPa$ S (50:50 in butyl glycol).

The long-chain polymers containing aliphatic alcohol groups which are used as component B) are known per se. They belong to the group of hardening resins containing aliphatic alcohol groups. They are used for improving the hardness-to-elasticity ratio. It is particularly preferred for the long-chain polymers (component B) to contain less than 0.4, preferably less than 0.2 and, with particular preference, less than 0.1 milliequivalents of carboxyl groups. In one preferred embodiment of the invention, the long-chain polymers containing aliphatic alcohol groups (component B) are adducts with an average molecular weight (Mn) of from 400 to 4000 of resins containing at least two epoxy or isocyanate groups with proton-reactive compounds. Since, as mentioned above, the adducts must contain aliphatic alcohol groups, the proton-reactive compounds must contain alcohol groups of the type which are not reacted with the epoxy groups or isocyanate groups. In other words, an excess of OH-groups must be present or other proton-reactive groups, such as amino or carboxyl groups, must be present in such a quantity that the epoxy or isocyanate groups are completely reacted, whilst hydroxyl groups are left over. Examples of reactions such as these are given in Table 1.

milliequivalents of aliphatic alcohol groups, the ratio by weight of resins of component (B) to resins of component (C) amounting to 1:0-5, preferably to at least 1, 0.1 and, with particular preference, to at least 1:0.5 and the ratio of all the carboxyl groups present in the coating composition to the hydroxyl groups having the value mentioned in claim 1.

This last group of compounds corrects the ratio of COOH to OH-groups without appreciably reducing the effect of the olefin polymer oil structure for which the compounds of component (A) are responsible. It is desirable to keep the proportion of compounds of component (B) as low as possible so that the proportion of compounds of component (C) can be kept relatively high. In other words, it is preferred to use as small as Table 1

In one particular embodiment, the long-chain polymers containing aliphatic alcohol groups (component B) contain aromatic and/or cycloaliphatic rings in the chain and at least two, preferably at least 4, terminal primary alcohol groups per molecule. In another preferred embodiment of the invention, the long-chain polymers (component B) are copolymers having a molecular weight (Mn) of from 1000 to 8000 of
 (a) vinyl monomers containing no reactive groups other than the vinyl group, of which the homopolymers have a glass transition temperature of from 60° to 150° C., preferably of at least 80° C. and preferably of at most 120° C., and
 (b) aliphatic vinyl monomers preferably containing primary alcohol groups.

In another preferred embodiment, the coating composition according to the invention is characterised in that it additionally contains
 (c) resins having a molecular weight of from 500 to 4000 and an olefin polymer oil structure and containing from 1 to 5.5 and preferably from 1.5 to 4.5 possible a quantity of compounds of component (B) and to keep the quantity of compounds of component (C) relatively high taking into account the above definition of the quantitative ratios.

The ratio of COOH to the sum of the OH-groups which may emanate from the compounds of the various components amounts to between about 0.9 and 15:1 and more especially to between 2 and 8:1. The resins are best produced in such a way that a possible acid number is below 20, preferably below 10 and, with particular preference, below 5.

The hardening resins (component B) include for example
 1. Long-chain reaction products of polyglycidyl ethers or esters with water, oxymonocarboxylic acids and/or amino alcohols. Preferred long-chain reaction product are long-chain reaction products of polyglycidyl ethers of bisphenol A with oxymonocarboxylic acids and/or secondary amino alcohols. The reaction products best have an OH-number of from about 200 to 650 and a molecular weight (M$n$) of from about 500 to 4000. The oxycarboxylic acids used are, for example, glycolic acid, lactic acid, dimethylol propionic acid, 2,4,6-trihydroxy benzoic acid etc. Reaction products of epoxy resins with dimethylol propionic acid are preferred. Suitable amino alcohols containing a reactive NH-group are, for example, diethanolamine, di-n-butanolamine, methylethanolamine, diisopropanol-amine, N-cyclohexyl ethanolamine, etc. It is preferred to use the reaction product of epoxy resins with diethanolamine. The molar ratios are selected in such a way that all the epoxy groups are split up, although sufficient hydroxyl groups are left for the reaction which takes place during stoving. The reaction is carried out azeotropically in an inert gas in the presence of, preferably, triphenyl phosphine as catalyst at temperatures best in the range from 120° to 170° C.

2. Long-chain reaction products of polyisocyanates with polyalcohols, primary or secondary amino alcohols. They are formed by reaction in an NCO:OH molar ratio of less than 1. By a two-stage reaction, it is possible in a first stage to produce an isocyanate-containing preadduct which, in a second stage, is reacted with polyols in order to introduce terminal alcohol groups. The resins best have an OH-number of from 150 to 600, preferably from 200 to 400, and a molecular weight (M$n$) of preferably from 400 to 4000. Suitable polyisocyanates are toluene diisocyanate, diphenyl methane diisocyanate, dicyclohexyl methane diisocyanate, isophorone diisocyanate or the biuret of trimethylene diisocyanate. Isocyanate-containing prepolymers of relatively high molecular weight are produced by using dialcohols and polyalcohols of the glycerol type, the trimethylol propane type, the 1,4-bis-(hydroxymethyl)-cyclohexane type, the neopentyl glycol type, the hydroxy pivalic acid neopentyl glycol ester type, the 2,2,4-trimethyl-1,3-propane diol type, the 1,1-isopropylidene-bis-(p-phenoxy)-2-propanol type, etc. The isocyanate-containing products are then reacted with polyalcohols, such as trimethylol propane or pentaerythritol, or with amino alcohols such as diethanolamine, di-n-butanolamine, methyl ethanolamine, diisopropanolamine, aminomethyl propane diol, tris-(hydroxymethyl)-aminomethane. The molar ratio of NCO-group to NH = or NH$_2$-group must be 1:1 in order to avoid free amino groups. Similarly, approximately one molecule of polyalcohol is used per NCO-group so that an isocyanate-free OH-group-containing component is formed. The reaction of the isocyanates with OH- or NH-group-containing compounds is carried out in the melt or in solution in solvents which do not react with isocyanates, the reaction temperature being in the range from room temperature to around 150° C. according to the reactivity of the individual groups. The influence of moisture should be avoided during the reaction. In cases where OH resins containing a basic nitrogen atom from the groups 1 and 2 are used, it is important to bear in mind that protection against corrosion deteriorates after a particular concentration to be determined by testing has been exceeded. With increasing molecular weight of the compounds which are reacted with the amino alcohols, the proportion of these reaction products in the binder mixture may be increased.

3. Copolymers of vinyl monomers containing no reactive groups apart from the vinyl group, of which the homopolymers have a glass transition temperature of from about 60° to 150° C., and vinyl monomers containing aliphatic alcohol groups. Examples of the first of these two types of monomer are methyl methacrylate, ethyl methacrylate, isopropyl methacrylate, tert.-butyl methacrylate, cyclohexyl methacrylate, acrylonitrile, styrene, α-methyl styrene, vinyl toluene, indene, dimethyl fumarate, dimethyl itaconate. Examples of vinyl monomers containing aliphatic alcohol groups are hydroxyalkyl(meth)acrylic acid esters, such as hydroxyethyl methacrylate, hydroxypropyl methacrylate, butane diol monomethacrylate, 2,2-dihydroxy propyl methacrylate, diethylene glycol monomethacrylate, N-hydroxyalkyl-(meth)-acrylic acid amides, for example N-(2-hydroxyethyl)-methacrylamide, N,N-bis-(hydroxyethyl)-acrylamide, N-[2-hydroxy-1,1-bis-(hydroxymethyl)]-ethyl methacrylamide, allyl alcohol or polyalcohol monoallyl ethers, for example trimethylol propane monoallyl ether or pentaerythritol monoallyl ether. The OH-groups may also be incorporated by copolymerising glycidyl(meth)acrylate, followed by hydrolytic splitting of the epoxy group. The OH-groups may also be incorporated by reacting carboxyl-group-containing copolymers with alkylene oxides, for example ethylene oxide or propylene oxide. It is preferred to use copolymers containing primary OH-groups and no aromatic rings. The OH-numbers best mount to between 50 and 500, preferably to between 100 to 300, whilst the molecular weight (M$n$) is best in the range from 1000 to 8000. Copolymerization is carried out in the usual way by heating in organic solvents, such as sec.-butanol, ethyl glycol or butyl glycol, in the presence of radical initiators soluble in monomers, such as tert.-butyl peroctoate, tert.-butyl hydroperoxide, cumene hydroperoxide, di-tert.-butyl peroxide or azo-bis-isobutyronitrile.

The alcohol-group-containing resins of olefin polymer oil structure, i.e. containing olefinic double bonds, which are used as component C may be obtained by the addition of monoepoxides with carboxyl-group-containing and hydride-free olefin polymer oils or by reacting anhydride-containing olefin polymer oils or, better still, their C$_{1-6}$-monoalcohol semiesters with hydroxyalkylamines.

The anhydride-free carboxyl-group-containing olefin polymer oils are obtained by hydrolysis of the anhydride-containing olefin polymer oils or by the addition of α,β-unsaturated monocarboxylic acids with olefin polymer oils. The reaction with monoepoxides, for example ethylene oxide or, better still, alkylene oxides, such as propylene oxide, or with monofunctional glycidyl ethers or glycidyl esters, such as butanol glycidyl ether or phenyl glycidyl ether, is carried out at reaction temperatures of from about 50° to 100° C. The catalysts best used are tertiary amines such as triethylamine or dimethyl benzylamine. 1 mole of epoxide is reacted per carboxyl group. The finished resin best has an OH-number of from 50 to 250 and a molecular weight (M$n$) of from 500 to 4000.

The anhydride-containing olefin polymer oils or their semiesters are converted into hydroxyalkyl imides by reaction with hydroxyalkylamines. This reaction is carried out in stoichiometric quantities, best at temperatures in the range from 40° to 180° C. and preferably at temperatures of from 60° to 160° C., as measured in the reaction carried out under reduced pressure. The reaction is complicated by crosslinking reactions with increasing number of OH-groups per aminoalcohol. In order to avoid gelation, it is advisable not to use the anhydride, but instead the methanol or butanol semiester for example as the starting product. In addition, the reaction temperature of from about 60° to 110° C. should not be increased for ring closure until transamidation is complete. Examples of amino alcohols containing a primary NH$_2$-group are monoethanolamine, monoisopropanolamine, 2-amino-2-methyl propanol, 2-amino-2-methyl-1,3-propane diol, 2-amino-1-butanol, tris-(hydroxymethyl)-aminomethane, "diglycolamines," such as 2-(2-aminoethoxy)-ethanol or aminocyclohexanol. The resins best have an OH-number of from 50 to 300 and a molecular weight (M$n$) of from 500 to 4000.

The aqueous coating composition according to the invention is best produced by grinding part of component (A) with pigments, fillers, corrosion inhibitors, lacquer auxiliaries and/or organic solvents, mixing the resulting mixture with components (B) and, optionally, (C), followed by partial neutralization and by gradual dilution with water and, optionally, organic solvents.

Components (B) and (C) are best incorporated by mixing the resins in liquid form with the carboxyl-group-containing component (A), into which the pigments have been worked, neutralizing the resulting mixture and diluting it with water and, optionally, solvents. If the OH-resin is not completely liquid, it may be dissolved in the highest possible concentration in alcoholic or glycolic solvents.

In order to avoid precipitation phenomena in the electrophoresis bath, a number of factors must be born in mind during incorporation of the OH-group-containing resins:

1. The anhydride groups of component A) must be completely split up by hydrolysis, semi-esterification and/or semi-amidation.
2. Precipitations decrease with increasing OH-number of the resin; at the same time there may be a reduction in elasticity.
3. The solvent used influences stability and must be tried out for the particular combination. Butyl glycol and sec.-butanol have proved to be effective in many cases.
4. When preparing the aqueous concentrated binder, it is important to ensure that no precipitation shock is triggered off by overlarge portions of water. It has proved to be best to make the addition of amine to MEQ of about 10 to 30 and water to solids of 60 to 85% by weight by initially stirring the amine into a small quantity by weight of water and then adding the rest of the water in increasing quantities which substantially correspond to a geometric series.
5. Concentrated binders of relatively high solids contents are generally more stable than binders with relatively low solids contents, a possibility which is limited by the processing viscosity of the material and its solvent content.

Concentrated solutions may also be prepared by hydrolysing any anhydride groups still present with water at 80° to 100° C., followed by dilution with sec.-butanol, isopropanol or glycol ethers. Where OH-resins containing several basic nitrogen atoms are used, the viscosity of the concentrate increases drastically and it may be necessary only to add this resin during the further dilution of the lacquer refill material.

The baths are stabilized in terms of ageing by adding phenolic inhibitors, such as hydroquinone, 2,6-di-tert.-butyl-4-methyl phenol, 2,4-dimethyl-6-tert.-butyl phenol, or aromatic amines such as phenyl naphthylamine, diphenylamine or phenylene diamine derivatives.

In addition to ammonia, suitable bases for neutralizing the products according to the invention are primary, secondary or tertiary alkylamines, for example diethylamine, triethylamine, morpholine, and also alkanolamines such as dusopanulamine, triethanolamine, 2dimethylamino-2-methyl propanol, dimethylaminoethanol or possibly even small quantities of alkylene polyamines, such as ethylene diamine or diethylene triamine and possibly even quaternary ammonium hydroxides, such as triethyl benzyl ammonium hydroxide. The quantity and type of amine neutralizing agent used influences the mechanical stability of the aqueous dispersion. Volatile nitrogen bases, such as ammonia or triethylamine, are preferred although it is also possible to use involatile bases, such as lithium, sodium or potassium in the form of hydroxides or alkali salts, for example carbonates. In general, the base is added in the quantity required by the carboxyl-group-containing polymer oil to dissolve in water. The base is preferably used in a stoichiometric deficit, i.e. 0.4 to 1.0 equivalent of amine based on one equivalent of carboxyl groups, because surface faults occur if the amine is added in excessive quantities. The neutralized dispersion should have a pH-value of from about 6.8 to 7.5 for a solids content of from 7 to 20% by weight. The viscosity of the dispersion increases at lower pH-values and decreases at higher pH-values.

In order to promote dilutability with water, to make the concentrated resins easier to handle and to stabilize the dispersions, the coating compositions according to the invention may also contain solvents. Solvents having unlimited miscibility with water are used in relatively large quantities for reducing viscosity. Solvents such as these are alcohols (methanol, isopropanol or sec.-butanol), semiethers of glycols, such as ethylene glycol monoethyl ether or ethylene glycol monobutyl ether, or ketoalcohols, such as diacetone alcohol. The viscosity anomaly occurring during dilution with water may be influenced particularly favourably by the addition of solvents having limited solubility in water, such as n-butanol, amylalcohol, isophorone or methylisobutyl ketone, which has a positive effect upon the dilutability of the resins. By adding small quantities of aromatic or aliphatic hydrocarbons of different chain length, the water-insoluble resin constituents may often be better dispersed in the aqueous phase, their stability increased and the fluidity of the deposited film improved.

The coating compositions contain the usual additives, such as pigments, fillers, corrosion inhibitors, crosslinking agents, metal siccatives, antifoaming agents, as generally known for coating compositions in this technical field. It is important to ensure that they do not enter into any troublesome reactions with water, do not entrain any water-soluble foreign ions and do not precipitated during ageing.

In order to promote the crosslinking of the film, it is often of advantage to add to the emulsions drying substances, such as resinates or octoates of iron, manganese, cobalt and, optionally, radical formers, such as peroxides, hydroperoxides or peresters with different decomposition temperatures, or even vulcanisation accelerators. In order to avoid precipitation phenomena, it is often advisable to grind these substances with the liquid resins containing aliphatic alcohol groups.

The concentrates having a solids content of from 85 to 60% by weight may be pigmented in the usual way, for example in a ball mill, on a three-roll stand or in a sand mill, and may be processed by any of the usual coating techniques (spread coating, roll coating, spray coating, dip coating) after dilution to the particular processing consistency required. The pigment-to-binder ratio is dependent upon the viscosity of the binder and, in the case of electro-dip-lacquering, generally amounts to between 0.51:1 and 0.4:1).

Where grinding is carried out in the presence of components containing hydroxyl groups, the increase in the temperature of the highly viscous products is in itself sufficient to produce a partial crosslinking reaction which adversely affects the stability of the bath and leaves the deposited film with inadequate levelling properties. Accordingly, it is best to grind part of component A) with pigments, fillers, corrosion inhibitors, lacquer auxiliaries and/or organic solvents, followed by cold mixing with the rest of component A), component B) containing the hydroxyl groups and, optionally, component C).

The lacquers are particularly suitable for the electro-dip-lacquering of metals and give smooth, hard films showing high elasticity, for example after stoving for 30 minutes at 180° C. Coatings with improved elasticity properties are obtained. The films may be deposited at temperatures of up to about 30° C. with deposition voltages of from 150 to 400 volts for a dry film thickness of 25 μm. The resin viscosity, solids content, deposition temperature and time and also the voltage are selected in such a way that the required layer thickness is obtained on the metal sheet after rinsing and stoving.

Now so that those skilled in the art can more fully understand the invention, the following Examples are submitted.

EXAMPLE 1

(a) In a three-necked flask, 1617 g of a 1,4-cis-polybutadiene oil having an average molecular weight of around 1500 are heated under nitrogen to around 140° C. with 250 g of technical xylene and 5 g of a standard commercial-grade antiager of the diarylamine type. Following the addition of 533 g of maleic acid anhydride, the temperature is increased to 195° C. and kept at that level until no more free maleic acid anhydride can be detected. After the xylene has been distilled off, the mixture is cooled to around 80° C. Following the addition of 2.4 g of triethylamine, 33 g of water and 114 g of methanol, the mixture is heated for 2 hours to around 100° C.–130° C. The following final values are measured:

Viscosity: 2000 $m.Pa.s$ (as measured on a 60% solution in butyl glycol at 25° C.)

Acid number: 166 (as measured with aqueous KOH).

After cooling to 100°–120° C., the resin is diluted with sec.-butanol to a solids content of 85% by weight (as measured by heating for 40 minutes to 180° C. in a recirculating air drying cabinet).

1 g of resin contains 2.96 milliequivalents of carboxyl groups and 1.57 milliequivalents of methanol for ester groups. Accordingly, there are 67 milliequivalents of carboxyl groups to 100 milliequivalents of the sum of milliequivalents of carboxyl groups and milliequivalents of ester groups.

(b) 1000 g of sec.-butanol are heated to around 95°–100° C. in a three-necked flask equipped with a reflux condenser, dropping funnel and stirrer. A mixture of 636 g of methyl methacrylate, 344 g of hydroxyethyl methacrylate and 20 g of azo-bis-isobutyronitrile is then added over a period of 3 hours. On completion of the addition, 3 ml of tert.-butyl-peroctoate are added twice at intervals of 1 hour in order to complete polymerization.

Solids content: 51.1% by weight (after heating for 30 minutes to 150° C.)

Viscosity: 5400 m.Pa.s (as measured on a 40% solution at 25° C. after further dilution with butyl glycol)
OH-number (calculated) = 148.

(c) Refill concentrate

First 2.5 g of water and then, 30 minutes later, 223 g of the acrylic copolymer solution b) are added at 75° to 80° C. to 660 g of the butadiene oil semiester produced in accordance with (a). This is followed by the addition at intervals of 15 minutes of:

a mixture of
21 g of triethylamine and 5 g of water
10 g of water
25 g of water
53 g of water and 0.5 g of hydroquinone.

The mixture is then thoroughly stirred for 1 hour at around 75° C. Solids content: 77.6% by weight (after heating for 40 minutes to 180° C.).

(d) Deposition bath 257 g of the refill concentrate are gradually diluted with 12.8 g of triethylamine and 1730 g of distilled water. MEQ-value = 86 (= milliequivalents of amine per 100 g of solids)

Solids: 10.2% by weight (after heating for 15 minutes to 185° C.).

The diluted bath is stirred for 24 hours. The functional data measured are shown in Table II.

Comparison Test (according to DT-AS No. 1,929,593)

To prepare a deposition bath, 188 g of the 85% resin of Example 1a) are mixed with 66 g of water-soluble phenolic resin (Resydrol WP 408) and the resulting mixture is gradually diluted with 14.4 g of triethylamine and 1730 g of distilled water. MEQ-value = 84

Solids content: 10% by weight (after heating for 15 minutes to 185° C.).

The results obtained are shown in Table II.

EXAMPLE 2

(a) In a 4 liter flask, 1617 g of a 1,4-cis-polybutadiene oil having an average molecular weight of around 1500 are heated under nitrogen to around 140° C. with 250 g of technical xylene and 5 g of a standard commercial-grade antiager of the diarylamine type. Following the addition of 533 g of maleic acid anhydride, the mixture is heated to a temperature of 195° C. and kept at that temperature until no more free maleic acid anhydride can be detected. After cooling to 165°–170° C., 75 g of urea are scattered in very slowly in very small portions, resulting in heavy foaming through the elimination of carbon dioxide, and the water of reaction is removed from the circuit. After the foaming has abated, the temperature is increased to 190° C. and a vigorous stream of nitrogen is passed through until no more carbon dioxide can be detected with barium hydroxide solution. The solvent is then distilled off in vacuo. The following final values are measured:

Viscosity: 559 $m.Pa.s$ (as measured on a 50% solution in butyl glycol at 25° C.)

Acid number: 152 (as measured with aqueous KOH).

1 g of resin contains 2.71 milliequivalents of carboxyl groups and 1.16 milliequivalents of maleic imide groups. Accordingly, there are 70 milliequivalents of carboxyl groups to 100 milliequivalents of the sum of milliequivalents of carboxyl groups and milliequivalents of imide groups.

(b) 200 g of technical xylene and 4 g of triphenyl phosphine are heated in an inert gas to a temperature of 120°–130° C. 1348 g of an epoxy resin having an epoxy value of from 0.1 to 0.11 and a molecular weight of around 1400 are then added in small portions. After everything has melted, 190 g of dimethylol propionic acid are added. The reaction temperature is slowly increased to 160°–200° C. The water of reaction is then azeotropically removed from the circuit. The mixture is then heated until it has an acid number of less than 1. Finally, the solvent is distilled off.

Viscosity: 2705 $m.Pa.s$ (50:50 in butyl glycol at 25° C.) OH-number (calculated) = 322.

After cooling to 120° C., the resin is diluted with butyl glycol to a solids content of 70% by weight.

(c) Refill concentrate 684 g of the butadiene oil imide (a) are pre-hydrolysed at 75 to 80° C. with 10 g of butyl glycol and 25 g of water for about 1 hour at 90° C. 109 g of the Epikote ester (b) are then slowly stirred in over a period of about 30 minutes. This is followed by the addition at intervals of 15 minutes of:

a mixture of:
21 g of triethylamine and 5 g of water
10 g of water
25 g of water
60 g of water, 50.5 g of sec.-butanol and 0.5 g of hydroquinone.

The mixture is then thoroughly stirred for 1 hour at 65° to 75° C. Solids content: 76.8% by weight (after heating for 40 minutes to 180° C.).

(d) Deposition bath 390 g of the refill concentrate are gradually diluted with 13.8 g of triethylamine and 1596 g of distilled water. MEQ-value = 93

Solids content: 15.2% by weight (after heating for 15 minutes to 185° C.).

The results obtained are shown in Table II.

EXAMPLE 3

(a) The procedure is as in Example 1 using the following quantities:

I.
2472 g of a polybutadiene oil having a molecular weight of about 1500 (75% 1,4-cis, 24% 1,4-trans, 1% vinyl)
274 g of a polybutadiene oil having a molecular weight of about 3000 (80% 1,4-cis, 19% 1,4-trans, 1% vinyl)
336 g of technical xylene
4 g of antiager of the diarylamine type
914 g of maleic acid anhydride II.
a mixture of:
45 g of water
4 g of triethylamine
224 g of methanol III. dissolution with 518 g of butyl glycol and 2.2 g of hydroquinone.

Viscosity: 1560 $mPas$ (60% in butyl glycol at 25° C.)

Acid number: 149 (aqueous KOH) = 2.66 m equiv./g of resin

Solids content: 88.3% by weight (40 minutes at 180° C.).

1 g of resin was reacted with 1.81 milliequivalents of methanol to form "ester" groups. There are 60 milliequivalents of COOH-groups to 100 milliequivalents.

(b) An Epikote dimethylol propionic acid ester according to Example 2b) was used and the following final values were obtained:

Viscosity: 1500 $mPas$ (50:50 in butyl glycol) at 25° C.

Solids content: 74.4% by weight (40 minutes at 180° C.)

Hydroxyl number (calculated) 322 = 5.74 m equiv./g of resin.

(c) 1520 g of a polybutadiene oil having a molecular weight (Mn) of around 3000 (80% 1,4-cis, 19% 1,4-trans, 1% vinyl) and 169 g of a polybutadiene oil having a molecular weight (Mn) of about 1500 (75% 1,4-cis, 24% 1,4-trans, 1% vinyl) are heated under nitrogen to a temperature of 130° C. with 250 g of technical xylene and 2.5 g of an antiager. Following the addition of 295 g of maleic acid anhydride, the mixture is heated to a temperature of 195° C. and kept at that temperature until no more free maleic acid anhydride can be detected. After cooling to 120° C., 107 g of methanol and 1.5 g of triethylamine as catalyst are needed. After 4 hours, 156 g of monoethanolamine are added and the mixture heated to 145° C. to distill off the methanol. The last traces of solvent are removed by applying a vacuum.

Viscosity: 1125 $mPas$ (50% in butyl glycol at 25° C.)

Acid number: 5.8 (= 0.1 m equiv./g of resin)

Hydroxyl number (calculated): 69 (= 1.23 m equiv./g of resin).

The mixture was diluted to a solids content of 85.3% by weight with butyl glycol and secondary butanol (1:1). Deposition bath:

158.6 g of the butadiene oil (a) are mixed with 53.8 g of Epikote dimethylol propionic acid ester (b) and 23.4 g of butadiene oil hydroxyalkyl imide (c), and the resulting solution is gradually diluted with 18 g of triethylamine and 1746 g of distilled water. Solids content: 10% by weight.

The test results are shown in Table III.

EXAMPLE 4

(a) The procedure is as in Example 2 using the following quantities:
900 g of a polybutadiene oil having a molecular weight of about 1800 (40% vinyl, 14% 1,4-cis, 39% 1,4-trans)
900 g of a polybutadiene oil having a molecular weight of about 1500 (75% 1,4-cis, 24% 1,4-trans, 1% vinyl)
220 g of technical xylene
3 g of antiager of the diarylamine type
520 g of maleic acid anhydride
75 g of urea.

Viscosity: 810 $mPas$ (50% in butyl glycol at 25° C.)

Acid number: 130 (as measured with aqueous KOH) = 2.32 milliequivalents of COOH/g of resin Milliequivalents of maleic imide groups: 1.08 m equiv./g of resin. For 100 milliequivalents, there are 70 milliequivalents of COOH-groups.

1825 g of the resin are mixed with 94 g of butyl glycol at 110° C. and with 94 g of secondary butanol and 82 g of water at 100° C. This is followed by stirring for 2 hours at 80° C. Solids content: 88.9% by weight (40 minutes at 180° C.).

(b) 204 g of hydroxy pivalic acid neopentyl glycol ester and 101 g of methylisobutyl ketone are heated to 60° C., followed after the heating has been switched off by the introduction of 444 g of isophorone diisocyanate, the temperature rising to 128° C. under the effect of the exothermic reaction. After cooling to 90° C., 261 g of trimethylol propane are added, followed by stirring for 2 hours at around 110° C. The solvent is then distilled off in vacuo, and the residue diluted to 80% by weight with butyl glycol and isopropanol (1:1). Solids content: 80.3% by weight (40 minutes at 180° C.) NCO-content: less than 0.1%

OH-number (calculated) 240 = 4.2 m equiv./g of resin. Precipitation bath:

320.6 g of the butadiene oil a) are mixed with 18.7 g of the urethane alcohol b) and the resulting mixture is gradually diluted with 18.2 g of triethylamine and 1643 g of distilled water.

MEQ-value = 60
Solids content: 15% by weight (50 minutes at 185° C.)
The test results are shown in Table III.

Table II

|  | Comparison Test 1 | Examples | |
|---|---|---|---|
|  |  | 1 | 2 |
| Deposition conditions | 2 mins. at 20° C* | 2 mins. at 30° C | 2 mins. at 30° C |
| Deposition voltage | 115 V/25 μm | 210 V/25 μm | 300 V/25 μm |
| Stoving temperature | 30 mins. at 175° C | 30 mins. at 175° C | 30 mins at 175° C |
| Pendulum hardness (Konig) DIN 53157 | 90 secs. | 79 secs. | 78 secs. |
| Erichsen indentation** DIN 53156 | 2.5 mm | 4.3 mm | 6.4 mm |
| Salt spray test according to DIN 50021 (underrusting on the cut) |  |  |  |
| Bonder 127/360 hours*** | 2 - 3.5 mm | 1 - 1.5 mm | 1 - 2 mm |
| Unbonderized plate/144 hours | 1 - 2.5 mm | 1.5 - 2.5 mm | 1 - 2.5 mm |
| Bending test after the salt spray test** | complete flaking | limited flaking | in order |
| COOH:OH-ratio | — | 6.4 : 1 | 5.9 : 1 |

*a smooth film is no longer obtained at 30° C
**in order better to demonstrate the technical advance, the indentation values quoted relate to a black-pigmented film with a pigment-to-binder ratio of 0.25:1
***for better adaptation to practice, the unground side was tested Table III

|  | Example 3 | Example 4 |
|---|---|---|
| COOH : OH | 1.9 : 1 | 10.3 : 1 |
| Solids content (% by weight) | 10 % | 15 % |
| pH-value | 6.8 | 7.5 |
| Conductivity | 1350 μScm$^{-1}$ | 620 μScm$^{-1}$ |
| MEQ-value | 86 | 60 |
| Deposition conditions | 2 mins. at 20° C | 2 mins. at 30° C |
| Deposition voltage | 260 volt/25 μm | 410 volt/25 μm |
| Stoving temperature | 25 mins. at 175° C | 25 mins. at 175° C |
| Pendulum hardness (Konig) DIN 53 157 | 78"/90" | 65" |
| Erichsen indentation DIN 53 156 | 6.5 mm | 6.6 mm |
| Bending test | in order | almost in order |
| Salt spray test according to DIN 50 021 (underrusting on the cut) |  |  |
| 144 St. bright Fe | 0.5 - 1.5 mm | 3 - 6 mm |
| 360 St. bonderised 127 | 1 - 2 mm | 1.5 - 2.5 mm |

Test Series A

Base resin 250 g of technical xylene, 2.5 g of antiager of the diarylamine type, 1002 g of wood oil stand oil (30 Poises) and 662 g of lacquer-grade linseed oil are heated under nitrogen to 80°-100° C. Following the addition of 526 g of of maleic acid anhydride, the mixture is heated to a temperature of 195° C. and kept at that temperature until no more free maleic acid anhydride can be detected. After the solvent has been distilled off, 56.2 g of urea are carefully scattered in at around 165° C. After the foaming has abated, the temperature is increased to 180° C. and a vigorous stream of nitrogen is passed through until no more carbon dioxide can be detected with barium hydroxide solution. The following final values are measured:

Viscosity: 257 mPas (as measured on a 50% solution in butyl glycol at 25° C.)
Acid number: 139 (as measured with aqueous KOH).

Comparison Example 2 without addition of resin

Refill concentrate:

780 g of base resin are prehydrolyzed for 3 hours at 80° C. with 22 g of H$_2$O, after which the following quantities are stirred in at intervals of 15 minutes:
1. a mixture of 21 g of triethylamine, 10 g of water and 15 g of isopropanol
2. 46.6 g of water
3. 105 g of water and 0.4 g of hydroquinone Solids content: 78.4% by weight (40 minutes at 180° C.) Deposition bath:

255 g of refill concentrate are gradually diluted with 14.8 g of triethylamine and 1730 g of water.

Solids content: 10% by weight (15 minutes at 185° C.).

EXAMPLE 5

Added resin: 200 g of technical xylene and 4 g of triphenyl phosphine are heated in an inert gas atmosphere to a temperature of 120°-130° C. 1348 g of an epoxy resin based on bisphenol A and having an epoxy value of from 0.1 to 0.11 and a molecular weight of around 1400 are then added in small portions (EPIKOTE). After everything has melted, 190 g of dimethylol propionic acid are scattered in. The reaction temperature is slowly increased to 160° C.-200° C. At the same time, any water of reaction formed is removed from the circuit. The mixture is then heated until it has an acid number of less than 1. Finally, the solvent is distilled off and the residue diluted to 80% with butyl glycol.

Solids content: 80.2% by weight (40 minutes at 180° C.)
Acid number: 0.5 mg of KOH/g
Hydroxyl number (calculated): 322 mg of KOH/g = 5.74 m equiv./g.

Refill concentrate:

663 g of base resin are prehydrolysed for 3 hours at 80° C. with 22 g of water, after which 146 g of added resin are stirred in and the following quantities introduced at intervals of 15 minutes:
1. a mixture of 21 g of triethylamine, 10 g of water and 15 g of isopropanol 2. 40 g of water
3. 82.6 g of water and 0.4 g of hydroquinone Solids content: 77.3% by weight (40 minutes at 180° C.). Deposition bath:

258.7 g of refill concentrate are gradually diluted with 14.8 g of triethylamine and 1727 g of distilled water.

Solids content: 10% by weight (15 minutes at 185° C.).

EXAMPLE 6

Added resin:

Allyl alcohol-styrene copolymer having an average molecular weight (Mn) of 1150 and a hydroxyl number of 255 mg KOH/g, in the form of a 65% solution in secondary butanol. Refill concentrate:

663 g of base resin are prehydrolysed for 3 hours at 80° C. with 22 g of water, after which 180 g of added resin solution are stirred in and the following quantities introduced at intervals of 15 minutes:
1. a mixture of 21 g of triethylamine, 10 g of water and 15 g of isopropane
2. 30 g of water
3. 58.6 g of water and 0.4 g of hydroquinone Solids content: 79% by weight (40 minutes at 180° C.). Deposition bath:

253.2 g of refill concentrate are gradually diluted with 14.8 g of triethylamine and 1732 g of distilled water.

Solids content: 10% by weight (15 minutes at 185° C.).

EXAMPLE 7

Added resin:

1000 g of secondary butanol are heated to 100° C. and the following mixture added dropwise over a period of 4 hours:
460 g of hydroxyethyl methacrylate
260 g of methyl methacrylate
260 g of styrene
20 g of azo-bis-isobutyronitrile.

In order to complete polymerization, quantities of 3 ml of tert.-butyl peroctoate are added at intervals of 1 hour, followed by heating for 3 hours.

Solids content: 50.4% by weight (40 minutes at 180° C.)

Viscosity: 4 Pas (45% in secondary butanol)

Hydroxyl number (calculated): 202 mg KOH/g = 3.60 m equiv./g.

Refill concentrate:

663 g of base resin are prehydrolyzed for 3 hours at 80° C. with 22 g of water, after which 232 g of added resin solution are stirred in and the mixture diluted by the addition at 15 minute intervals of
1. a mixture of 21 g of triethylamine, 10 g of water, 15 g of isopropanol
2. 10 g of water
3. 26.6 g of water and 0.4 g of hydroquinone Solids content: 77.7% by weight (40 minutes at 180° C.). Deposition bath:

257.7 g of refill concentrate are gradually diluted with 14.8 g of triethylamine and 1727 g of distilled water.

Solids content: 10% by weight (15 minutes at 185° C.).

EXAMPLE 8

Added resin:

101 g of methylisobutyl ketone and 204 g of hydroxy pivalic acid neopentyl glycol ester are heated to 60° C., followed after the heating has been switched off by the addition of 444 g of isophorone diisocyanate, the temperature rising to 128° C. under the effect of the exothermic reaction. After cooling to 90° C., 261 g of trimethylol propane were added, followed by stirring for 2 hours at around 110° C. The solvent is distilled off in vacuo and the residue diluted to 80% by weight with butyl glycol and isopropanol (1:1).

Solids content: 80.3% by weight (40 minutes at 180° C.)

NCO-number: less than 0.1

Hydroxyl number (calculated): 240 mg KOH/g = 4.28 m equiv./g

Refill concentrate:

663 g of base resin are prehydrolyzed for 3 hours at 80° C. with 22 g of water, after which 146 g of added resin solution are stirred in and the mixture diluted by the addition at intervals of 15 minutes of
1. a mixture of 21 g of triethylamine, 10 g of water and 15 g of isopropanol
2. 40 g of water
3. 82.6 g of water and 0.4 g of hydroquinone Solids content: 78.1% by weight (40 mins. at 180° C.). Deposition bath:

256.1 g of refill concentrate are gradually diluted with 14.8 g of triethylamine and 1729 g of distilled water.

Solids content: 10% by weight (15 minutes at 185° C.).

Table IV

| Test Series A | Comparison 2 | Example 5 | Example 6 | Example 7 | Example 8 |
|---|---|---|---|---|---|
| pH-value | 6.95 | 7.15 | 7.35 | 7.5 | 7.0 |
| Conductivity ($\mu Scm^{-1}$) | 1350 | 1440 | 1450 | 1500 | 1320 |
| MEQ-value | 89 | 91 | 95 | 97 | 78 |
| Deposition conditions | 2 mins. at 30° C | 2 mins. at 30° C | 2 mins. at 30° C | 2 mins. at 30° C | 2 mins. at 30° C |
| Deposition voltage | 250 V/25 μm | 305 V/24–25μm | 280 V/24–25 μm | 230 V/24–25 μm | 300 V/25–26 μm |
| Surface | almost in order | in order | in order | in order | in order |
| Stoving temperature | 25 mins. at 175° C | 25 mins. at 175° C | 25 mins. at 175° C | 25 mins. at 175° C | 25 mins. at 175° C |
| Bending test* | in order | in order | in order | in order | in order |
| Pendulum hardness (Konig) DIN 53 157 | 48 secs. | 92 secs. | 104 secs. | 85 secs. | 90 secs. |
| Erichsen indentation DIN 53 156 | 9.0 mm | 9.0 mm | 8.4 mm | 8.5 mm | 9.4 mm |

*in order

Test Series B

Base resin:

99.5 g of technical xylene, 0.5 g of antiager of the diarylamine type and 800 g of the particular natural or synthetic oil mixture according to Table 5 are heated under nitrogen to 80°-100° C. Following the addition of 200 g of maleic acid anhydride, the mixture is heated to a temperature of 195° C. and is kept at that temperature until no more free maleic acid anhydride can be detected. This temperature is maintained until a viscosity of around 1300 mPas, as measured on a 75% solution in xylene at 25° C., is obtained. The solvent is then distilled off in vacuo.

Added resin:
1000 g of secondary butanol are heated to 100° C. and the following mixture added dropwise over a period of 4 hours:
636 g of methyl methacrylate
344 g of hydroxyethyl methacrylate
20 g of azo-bis-isobutyronitrile.

In order to complete polymerization, quantities of 3 ml of tert.-butyl peroctoate are added at intervals of 1 hour, followed by heating for 3 hours.

Solids content: 50.4% by weight (40 minutes at 180° C.)
Viscosity: 12.2 Pas (45% in secondary butanol)
Hydroxyl number (calculated): 151 mg KOH/g = 2.70 m equiv./g.

Refill concentrate:
663 g of base resin are prehydrolyzed for 3 hours at 80° C. with 22 g of water, after which 232 g of added resin solution are stirred in and the mixture diluted by the addition at intervals of 15 minutes of
1. a mixture of 21 g of triethylamine, 15 g of isopropanolamine and 10 g of water
2. 36.6 g of water and 0.4 g of hydroquinone Deposition bath:
200 g of solids of the refill concentrate are diluted with 14.8 g of tirethylamine and such a quantity of distilled water than a 10% by weight solution is formed.

Table V

| Test Series | Comparison 3** | Example 9 | Example 10 | Example 11 |
|---|---|---|---|---|
| Oil Mixture | 45 parts of linseed oil and 35 parts of linseed oil stand oil (50 poises) | 35 parts of butadiene oil* 45 parts of soya oil | 45 parts of butadiene oil* 35 parts of safflower oil | 80 parts of butadiene oil* |
| Hydrogenation iodine number | 152 | 270 | 287 | 440 |
| Proportion of oleic acid and saturated fatty acid | 32 % | 15 % | 10 % | 0 % |
| Viscosity (75 % in xylene) | 1545 mPas | 1455 mPas | 1310 mPas | 1565 mPas |
| Acid number | 205 | 200 | 206 | 217 |
| Solids content (15 minutes at 185° C) | 77.9 % by weight | 78.2 % by weight | 77.1 % by weight | 78.4 % by weight |
| pH-value | 6.65 | 6.35 | 6.65 | 6.2 |
| Bath conductivity (μScm$^{-1}$) | 1580 | 1250 | 910 | 900 |
| MEQ-value | 85 | 90 | 97 | 92 |
| Deposition conditions | 2 mins. at 30° C | 2 mins. at 30° C | 2 mins. at 30° C | 2 mins. at 30° C |
| Deposition voltage | 75 V/25-27 μm | 105 V/25 μm | 290 V/24-25 μm | 420 V/25 μm |
| Surface | smooth, in order | smooth, in order | smooth, in order | smooth, in order |
| Stoving temperature | 25 mins. at 175° C | 25 mins. at 175° C | 25 mins. at 175° C | 25 mins. at 175° C |
| Pendulum hardness (Konig) DIN 53157 | 35 secs. | 92 secs. | 99 secs. | 118 secs. |
| Erichsen indentation DIN 53156 | 9.2 mm | 6.4 mm | 6.3 mm | 5.3 mm |
| Bending test | in order | in order | in order | not in order |
| Coverage (sleeve method at 5/10mm) | 32 % /41 % | 40 % / 58 % | 91 % / 100 % | 100 % / 100 % |

*Butadiene oil having an average molecular weight (Mn) of about 1300 and a steric configuration of 42 % vinyl, 14 % 1,4-cis and 37 % 1,4-trans double bonds
**In order to obtain comparable viscosities, the test was carried out at 220 - 230° C in the absence of xylene and antiager That which is claimed is:

1. An aqueous coating composition free from phenolic resin, particularly for electro-dip-lacquering, containing a binder dilutable with water by neutralization with a base, wherein it contains in combination as binder component
   (A) 100 parts by weight of substantially anhydride-free reaction products containing carboxyl groups and, in addition, ester and/or amide and/or imide groups and having a molecular weight of from about 800 to about 5000, of
      (a) substantially carboxyl-group-free olefin polymer oils and/or natural unsaturated oils, the latter or their mixtures with the substantially carboxyl-group-free olefin polymer oils having a hydrogenation iodine number of more than about 150 and a content of saturated and/or mono-unsaturated fatty acids of less than about 25% by weight, with
      (b) α,β-unsaturated dicarboxylic acids or their anhydrides, particularly maleic acid anhydride, and converting the acid anhydride groups present, if any, into carboxyl groups and/or by introducing ester, amide and/or imide groups into the reaction products,
   the reaction products containing per gram of resin from about 2.0 to about 3.5 milliequivalents of carboxyl groups and up to about 2.4 milliequivalents, of ester, amide and/or imide groups at least about 50 milliequivalents of 100milliequivalents of the sum of milliequivalents of carboxyl groups, ester groups, amide groups and/or imide groups being carboxyl groups, and
   (B) 5 to 80 parts by weight of substantially carboxyl-group-free, saturated long-chain polymers having a molecular weight of from about 400 to about 10,000 and containing from about 1 to about 12 milliequivalents of aliphatic alcohol groups, the ratio of the carboxyl groups in the compounds of component (A) to the aliphatic alcohol groups in the compounds of component (B) amounting to from about 0.9 to about 15:1.

2. A composition according to claim 1, wherein the molecular weight of A) is from about 1000 to about 5000.

3. A composition according to claim 1, wherein the reaction products contain per gram of resin from about 2.4 to about 3.0 milliequivalents of carboxyl groups.

4. A composition according to claim 1, wherein the reaction products contain up to about 1.6 milliequivalents of ester, amide and/or imide groups.

5. A composition according to claim 1, wherein the reaction products contain at least about 60 milliequivalents of 100 milliequivalents of the sum of the milliequivalents of carboxy groups, ester groups, amide groups and/or imide groups being carboxyl groups.

6. A composition according to claim 1, wherein the ratio of the carboxyl groups in the compounds of component A) to the aliphatic alcohol groups in the compounds of component B) amount to from about 2 to 8:1.

7. A composition according to claim 1, wherein the long-chain polymers (component B) contain less than about 0.4 milliequivalents of carboxyl groups.

8. A composition according to claim 7, wherein the long-chain polymers (component B) contain less than about 0.2 milliequivalents of carboxyl groups.

9. A composition according to claim 8, wherein the long-chain polymers (component B) contain less than about 0.1 milliequivalents of carboxyl groups.

10. A composition according to claim 1, wherein the long-chain polymers containing aliphatic alcohol groups (component B) are adducts having a molecular weight of from about 400 to about 4000 of resins containing at least 2 epoxy or isocyanate groups with proton-reactive compounds.

11. A composition according to claim 1, wherein the long-chain polymers containing from about 2.5 to about 12 milliequivalents of aliphatic alcohol groups (component B) contain aromatic and/or cycloaliphatic rings in the chain and at least 2 terminal primary alcohol groups per molecule.

12. A composition according to claim 11, wherein the long-chain polymers containing from about 3.5 to about 10.5 milliequivalents of aliphatic alcohol groups (component B) contain aromatic and/or cycloaliphatic rings in the chain and at least 4 terminal primary alcohol groups per molecule.

13. A composition according to claim 1, wherein the long-chain polymer containing from about 1 to about 9 milliequivalents (component B) are copolymers having a molecular weight of from about 1000 to about 8000 of (a) vinyl monomers containing no reactive groups other than the vinyl group of which the homopolymers have a glass transition temperature of from about 60° to about 150° C. and (b) aliphatic vinyl monomers containing preferably primary alcohol groups.

14. A composition according to claim 13, wherein the glass transition temperature of the vinyl homopolymer is from about 80° C. to about 120° C.

15. A composition according to claim 1, wherein it additionally contains (c) resins having a molecular weight of from about 500 to about 4000 and an olefin polymer oil structure and containing from about 1.5 to about 4.5 milliequivalents of aliphatic alcohol groups, the ratio by weight of resins of component B) to resins of component C) amounting to about 1:0 to about 5 and the ratio of all the carboxyl groups present in the coating composition to the hydroxyl groups having the value mentioned in claim 1.

16. A composition according to claim 15, wherein the ratio by weight of resins of component B) to resins of component C) amounts to about 1:0.1 to about 1:0.5.

17. A process for producing the aqueous coating composition of claim 1 wherein part of component A is ground with pigments, fillers, corrosion inhibitors, lacquer auxiliaries, organics solvents, or mixtures thereof, the resulting mixture is mixed with component B, and thereafter partially neutralized and gradually diluted with water, organic solvents, or mixtures thereof.

18. A process for producing the aqueous coating composition of claim 15 wherein part of component A is ground with pigments, fillers, corrosion inhibitors, lacquer auxiliaries, organics solvents, or mixtures thereof, the resulting mixture is mixed with components B and C, and thereafter partially neutralized and gradually diluted with water, organic solvents, or mixtures thereof.

* * * * *